March 30, 1943.  P. J. YEATER ET AL  2,315,380

SAFETY PEDAL FOR BICYCLES

Filed May 22, 1941

Inventor
Paul J. Yeater
Douglas R. Yeater

By

Attorney

Patented Mar. 30, 1943

2,315,380

UNITED STATES PATENT OFFICE 2,315,380

SAFETY PEDAL FOR BICYCLES

Paul J. Yeater and Douglas R. Yeater, Salem, Oreg.

Application May 22, 1941, Serial No. 394,580

1 Claim. (Cl. 74—594.4)

This invention is directed to an improvement in bicycle pedals, and more particularly designed to present at all times, when the bicycle is being operated, light reflectors for receiving a reflected light directed toward the bicycle either from in front or in rear thereof, particularly with a view to enabling the driver of a motor vehicle or the like of being made aware of the presence of the bicycle and thus avoid collision.

Bicycle pedals generally and almost invariably include a frame comprising side bars connected at their ends by tread-receiving spindles or rods, with the frame centrally mounted on an axle forming a part of the crank of the bicycle. Rubber treads are mounted upon the spindles or bars to furnish a comparatively broad bearing for the foot of the rider, and automatically as the treads are roughened, a more or less non-slipping tread. These conventional treads are capable of being turned on the spindles or bars, primarily with a view to presenting a new surface for the foot of the rider, when one surface becomes worn, and the spindles themselves are removable from the frame to provide for the introduction of new treads, when necessary. However, it is to be borne in mind that these rubber treads of a pedal are capable of easy rotation on the spindles on which they are supported.

Bicycles are automatically equipped with lighting means on the handle bars or front frame, particularly for night riding, and ordinarily such lights serve to indicate to an oncoming motor vehicle, the presence of the bicycle. The rear of the bicycle, however, is not so protected, and the danger of a motor vehicle, naturally travelling at a greater speed than that of the bicycle, overtaking the bicycle before being fully aware of its presence, is a constant source of danger. This has been recognized and attempted to be overcome by providing reflector buttons on the rear seat, on the rear guard, or on other fixed parts of the bicycle, to furnish the oncoming motorist with a more distinct warning. However, few bicycles are provided with such rear reflectors, and the possibility that the headlight of the bicycle will not be lighted contributes in no small degree to the increasing number of accidents between motorists and cyclists.

It is the primary object of the present invention to provide with the pedals or pedal of a bicycle, a permanent means which will be always in position during the use of the bicycle to present a light reflecting means to the oncoming motor vehicle, and also to the following vehicle, to advise the drivers of such cars of the presence of the bicycle.

As previously stated, the conventional pedal tread is capable of rotation on its own axis within the pedal frame. If this were permitted in connection with the present primary features of invention, it is not only entirely possible, but highly probable that the pedal tread would be turned into such position that the light reflecting means would be entirely useless for its designed purpose.

Therefore, another and particularly important detail of the invention is the provision of the treads of the pedal having the capability of removable mounting of the conventional treads that will be nevertheless held against rotation relative to the frame—that is, on their own axis, and thus maintain the light reflective elements always in completely and fully operative positions when the bicycle is being used.

The invention is illustrated in the accompanying drawing in which.

Figure 1:
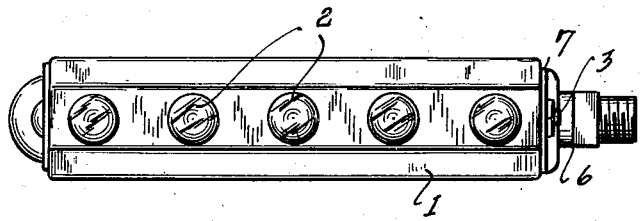
Figure 1 is an edge view of a bicycle pedal constructed in accordance with the present invention.
Figure 4:
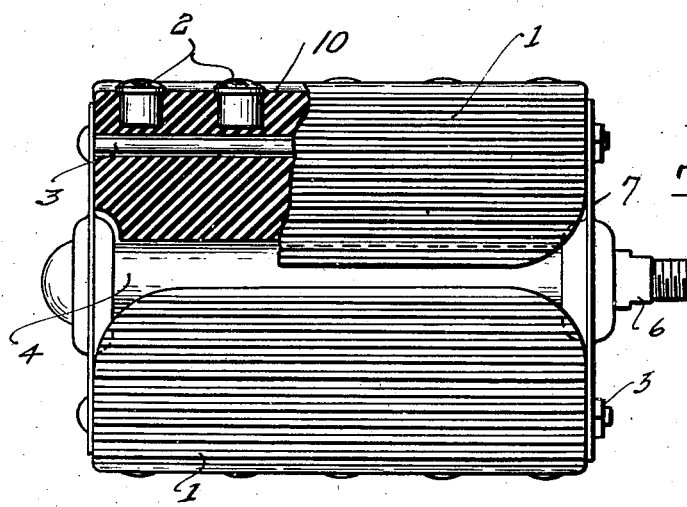
Figure 4 is a plan view partly broken out of one of the pedals.
Figure 2:
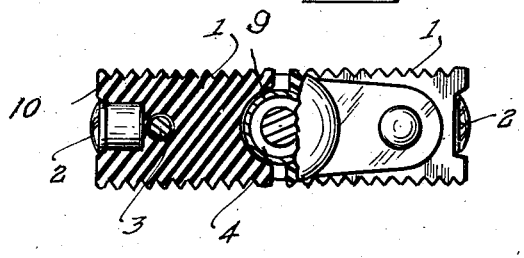
Figure 2 is a view in elevation partly in section transverse to the axis of the pedal.
Figure 3:
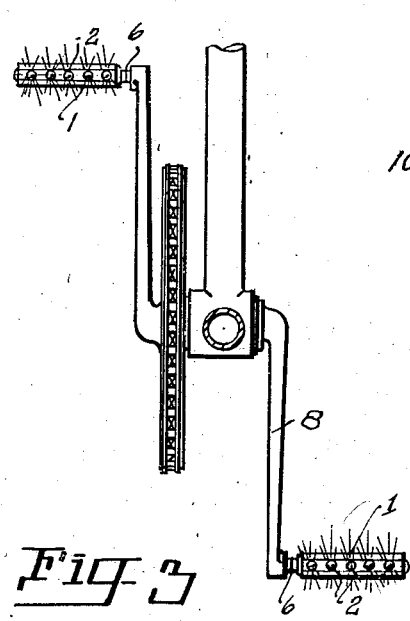
Figure 3 is a view in elevation of the pedal and crank assembly showing particularly the position of the respective pedals with regard to the reflective means.

With particular regard to Figure 4, the pedal, which aside from the tread elements, is more or less conventional, includes side plates 7, a central sleeve 4, rotatably mounted upon an axle 6 removably connected to the crank 8. The plates 7 are provided at their respective ends beyond the axle with spindles or rods 3, removably secured to the respective plates and extending in parallelism to the axle, which spindles 3 support the treads 1.

The treads 1, preferably of rubber or other appropriate material, and roughened on their respective surfaces as is conventional, differ from the ordinary treads of pedals in that while they are freely supported upon the spindles 3, their ends toward the axis 6 of the pedal are recessed at 9 to more or less snugly fit over the sleeve 4. In this manner of mounting, it will be appreciated that while the treads are capable of removal by separation of the spindles 3 of the frame, and while the pedal as a whole is rotatable on the axis 6, the respective treads 1 are not capable of independent movement with respect to the frame relative to either the spindle 3 or the sleeve 4. Thus the treads 1 always remain in the same position relative to each other, unless manually removed.

The treads in this position present end edges 10 of appreciable width and defining, when the bicycle is in use, the front and rear ends of the pedal extending beneath the foot of the rider.

Reflective elements 2 are embedded in these ends 10 of the treads. These reflective elements may be of conventional well known types, or any special type, so long as they are permitted to be properly embedded in the material of the tread to expose their reflective surfaces without obstruction. Of course, it is desirable to have the reflective elements of such form that they may be embedded within the material of the tread for fixity of position, and may be more or less protected by the tread proper against breakage.

The reflective elements are of a character to reflect any light directed against them, and by this reflection indicate the presence of the bicycle to any one to whom the reflection is visible. While the invention may be said to be but secondarily concerned in the number of such reflective elements embedded in each tread 1, we prefer, for reasons to be noted, that several such elements, for example five, as illustrated, be embedded in each tread, and that they be arranged in a direct line across the end. In this way the light of an approaching or following automobile will, in the rotation of the pedals as a whole during the operation of the bicycle, receive a distinct flashing of a series of light reflecting rays on each side of the bicycle, and which will be presented in a vehicle range coincident with the distance equal to the diameter of the circular path of the pedal as a whole during the movement of the bicycle.

There will thus be a characteristic and unusual light reflection covering a comparatively broad area which will unmistakably attract the attention of approaching motor vehicle and enable the driver thereof to control his vehicle to avoid collision.

The characteristic and important feature of the invention is to provide these reflectors in such manner that they will at all times remain effective to reflect light of an oncoming or following motor vehicle during the operation of the bicycle, and to secure which result it is also vitally necessary that the pedal treads be held incapable of independent rotation or movement in the pedal. Without such holding of the treads, it is entirely probable that the tread would be turned and render the light reflectors completely inoperative.

We claim:

A pedal, including a frame, transverse end spindles carried by the frame, a sleeve arranged transverse of and carried by the frame, said sleeve being intermediate the end spindles, a pedal tread removably supported on each spindle and covering the space between its supporting spindle and the sleeve, the ends of the treads adjacent the sleeve being each formed with a recess to receive and interfit with the sleeve to prevent independent movement of either tread on its spindle.

PAUL J. YEATER.
DOUGLAS R. YEATER.